Figure 1:
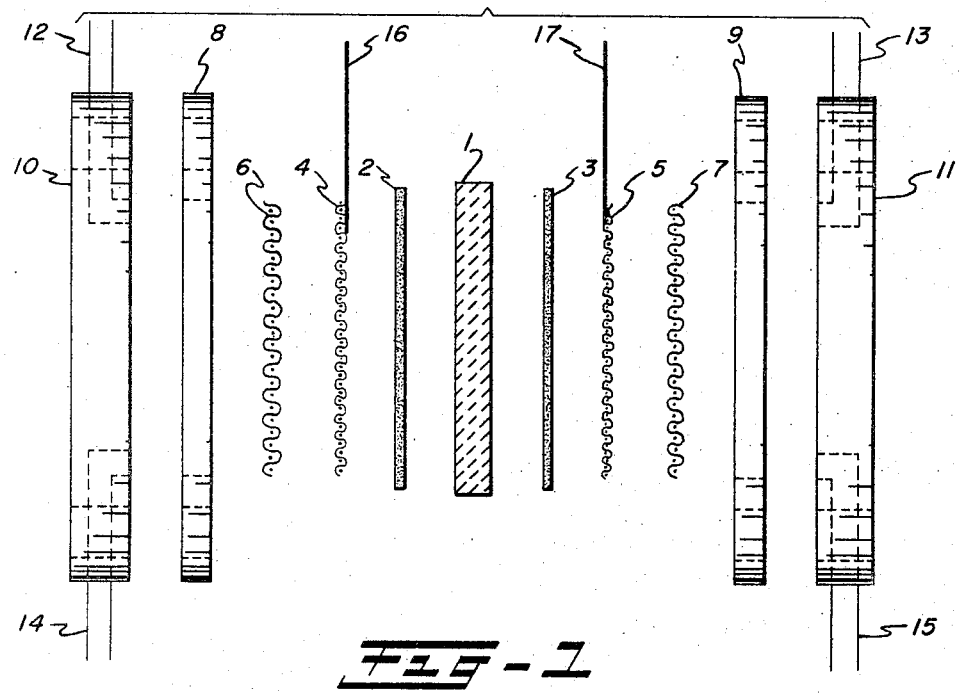

Oct. 24, 1967 W. A. BARBER ETAL 3,348,974
FUEL CELL CONTAINING A METALLIZED PAPER ELECTRODE
Filed July 1, 1963

INVENTORS.
William A. Barber
Norman T. Woodberry
BY
ATTORNEY

United States Patent Office 3,348,974
Patented Oct. 24, 1967

3,348,974
FUEL CELL CONTAINING A METALLIZED
PAPER ELECTRODE
William Austin Barber, Springdale, and Norman Thorndike Woodberry, Stamford, Conn., assignors to American Cyanamid Company, Stamford, Conn., a corporation of Maine
Filed July 1, 1963, Ser. No. 295,271
10 Claims. (Cl. 136—86)

This application is a continuation-in-part of our application, Serial No. 247,238, filed on Dec. 26, 1962, now abandoned.

The present invention relates to novel metallized paper electrodes suitable for use in fuel cells and especially for use in hydrogen-oxygen containing gas fuel cells. More particularly, the invention relates to novel metallized, unfused, fibrillated paper electrodes of uniform thickness and enhanced strength having minor amounts of catalyst uniformly distributed throughout said electrodes, and to methods for their preparation.

Heretofore, electrodes consisting of a high concentration of platinum black on a metal screen or a noble metal supported on carbon, have been utilized in low temperature hydrogen-oxygen containing gas fuel cells. Unfortunately, such electrodes are not entirely satisfactory, for the principal reasons that high concentrations of active metal catalyst in excess of about 25% are required and relatively small geometric surface area of electrode could be made. Large open-area electrodes having uniform distribution of active metal and water-proofing agent could not be efficiently made thus limiting the overall size of the fuel cell. The distributed active metal tends to agglomerate and the surfaces of such electrodes suffer from excessive local reaction or hot spots during operation which causes fuel cell failure. The water-proofing agent usually is distributed unevenly in the electrode causing flooding to occur during operation. Thus, there exists a need for an electrode having a low concentration of active metal of less than 25% that can be utilized in a fuel cell that gives superior performance and long life due to inherently uniform distribution of active metal and water-proofing components.

It is, therefore, a principal object of the present invention to provide an electrode which obviates the difficulties of the prior art practice. It is a further object to provide an electrode having a low active metal content of less than 25% and being of uniform thickness, enhanced strength and uniform catalyst distribution. It is a still further object of the invention to provide a process for preparing an electrode which contains a low active metal content uniformly distributed throughout said electrode, in a simple and economical manner. These and other objects will become apparent from a consideration of the following detailed description.

It has been surprisingly found that an electrode of uniform thickness, good strength, uniform catalyst distribution and low metal content can be provided in a straightforward manner utilizing an electrically conductive filler such as finely divided metal or carbon and a fibrillated, unfused paper web or pulp substantially inert to aqueous mineral acids and bases as the support for the catalyst. It has been further found that the utilization of electrically conductive filler incorporated into the fibrous pulp, to which a water-repellent composition is added, forms an enhanced medium onto which the catalytic metal is deposited in amounts of less than about 25%. When the metallized pulp is converted into a sheet suitable for electrode manufacture, the electrode is found to have the aforementioned desirable attributes.

According to the process of the present invention, the novel electrode is formed by combining four critical elements. These are:
  (a) a fibrillated, unfused paper web, or a mixture of unfused, fibrillated and nonfibrillated paper fibers,
  (b) an electrically conductive filler,
  (c) a water-repellent compound, and
  (d) an active metal catalyst.

In general, any order of addition of the above-enumerated elements is feasible. However, it is preferred for optimum operation to initially add the electrically conductive filler to a fibrous paper pulp and, thereafter, to add successfully a water-repellent composition and the catalytic metal material. Thus, electrodes of good strength, uniform thickness and uniform metal catalyst distribution are obtained.

The fibrous pulp may be prepared by any method known in the art. For instance, in the patent to Wooding et al., U.S. Letters Patent No. 2,810,646, issued on Oct. 22, 1957, there is described a method for preparing an acrylic fiber paper comprising water-fibrillated, wet-spun filaments of an acrylonitrile polymer. The pulp from which this paper is derived is eminently suitable as the supporting member for the active metal catalyst in accordance with the present invention. This patent is incorporated by reference in its entirety herein. Although the polymer in the Wooding et al. patent is defined as one containing acrylonitrile and up to about 15 percent by weight of a monomer copolymerizable therewith, monomer such as methyl acrylate can be present in an amount equal to 20 percent, or more. Other suitable fibrous materials which can be used, particularly in alkaline electrolyte cells, include: asbestos, polyvinyl alcohol, and the like. To the aforementioned can be added glass or metal fibers. In general, it has been found that from about thirty (30) to sixty (60) percent or more by weight of the overall electrode composition is attributable to the pulp.

To strengthen and increase the electrical conductivity of the resultant electrode, while permitting a substantial reduction of active metal catalyst normally required, it has been found highly desirable to introduce into the pulp an electrically conductive filler, such as a finely divided metal and a carbon of at least 99% purity, usually in an amount equal to from about 25% to 50% by weight of the overall electrode composition.

One illustrative electrically conductive filler is a graphitic carbon obtained as a by-product in the manufacture of calcium cyanamide from the reaction of calcium carbide and nitrogen at temperatures in excess of 1000° C. This carbon is found to be eminently well suited for use in a catalyst support. The crude byproduct and normally waste material resulting from the process, is washed with a base, such as sodium hydroxide, then with an acid, such as sulfuric acid, and dried.

Similarly, a graphitic carbon prepared as a byproduct from the reaction of nitrogen and barium carbide or strontium carbide at elevated temperatures can also be employed. In general, reactions in which carbon is produced by nucleation in a high temperature liquid state process may be employed to recover the carbon suitable for incorporation into the fibrillated pulp.

A typical analysis of a graphite made from the above described "cyanamide" process is as follows in percent:

Free carbon _____ 99.0
Total sulfur _____ 0.04
Total nitrogen _____ 0.1
Silicon _____ 0.1
Aluminum _____ 0.1
Calcium _____ 0.1
Ash _____ 0.8

It has a surface area as measured by nitrogen absorption of only 11 to 12 square meters per gram and a well developed X-ray crystal pattern which corresponds to graphite. This graphite has submicroscopic, hexagonal, platy crystals ranging from between about 0.25 to 20 microns in diameter. In addition it has a conductivity between 40 and 50 reciprocal ohms per centimeter measured on the powder at 2000 p.s.i.

Although the above defined carbon is a preferred embodiment other carbons similarly perform well. In addition, finely divided metals, such as titanium, tantalum and zirconium, all of which are inert in the particular medium of use can be employed.

It is highly advantageous to employ a water-repellent compound in admixture with the fibrous pulp. This reduces the possibility of flooding during cell operation. Where a water-repellent compound has been omitted, the performance of the electrode is substantially reduced in a comparatively short period of time. It is preferred, therefore, that the water-repellent compound be present in the formation of the electrode of the invention. Illustrative water-repellent compounds are: polytetrafluoroethylene, polyethylene, neoprene, styrene-butadiene copolymer, natural waxes and equivalents thereof. It is a good practice to employ from about 1% to about 25% by weight of the water-repellent compound based on the weight of the overall electrode composition. It is further necessary to include in the electrodes to be used in fuel cell operation an active catalytic metal, such as for instance platinum, palladium, ruthenium and equivalents thereof in amounts ranging from about 1% to less than 25% by weight based on the weight of the overall composition. Although platinum is the preferred metal, and will be exemplified, metals in the form of their acetates or nitrates of Group VIII, for instance, iron, cobalt and nickel, and Group Ib, for example, copper, silver and gold, can directly be reduced on the paper fiber to effect equal distribution of the catalyst through the mass.

The metallized pulp mass can be readily formed into desired electrode sheets. In general, the pulp so metallized is laid down as a uniform web on conventional paper making equipment and is dried. Uniform distribution of catalytic active metal as well as uniform thickness of the resultant paper electrode is achieved.

In like manner, a unitary composite comprising an inner hydrophilic fibrous layer and outer electrode layers as above-defined can be prepared by pressing the layers together, drying at about 250° F. and, thereafter, equilibrating resultant composite with electrolyte.

In order to further clarify the invention utilizing a uniformly distributed, catalytic, metallized, unfused, fibrillated sheet as an electrode, these and other embodiments of the invention are shown in the accompanying drawing and will be described in detail in conjunction with that drawing.

Figure 2:
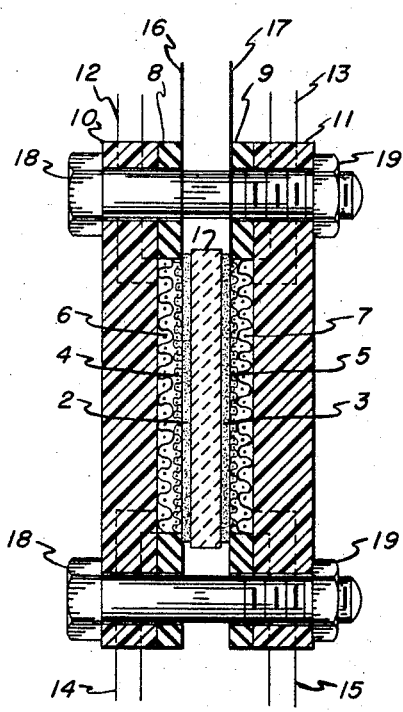

In the drawing:

FIG. 1 is an exploded plan view partially in section, of a fuel cell, employing the electrode of the present invention, and FIG. 2 is a partially expanded side view, partially in section of the fuel cell of FIG. 1.

In FIG. 1, the membrane 1, is positioned between metallized paper electrodes 2 and 3 of this invention. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber gaskets. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 5 are provided as vents for unused gases. Wire leads 16 and 17, connected onto current collector screens 4 and 5 are the conductive members through which current flows from and to the fuel cell via the external circuit when the cell is in operation. The cell is secured by means of bolts 18 and nuts 19 as shown in FIG. 2.

The invention will be illustrated in conjunction with the following examples which are to be taken as illustrative only and not by way of limitation. All parts are by weight unless otherwise stated.

Example 1

A catalyst consisting of 5% platinum deposited on graphitic carbon of 99% purity is introduced into an acrylic fiber in aqueous suspension in the ratio of one part by weight of catalyst and one part by weight of acrylic pulp comprising 90% acrylonitrile and 10% methyl methacrylate copolymer. No water-proofing agent is added. Resultant pulp mixture is then introduced into a paper making machine in the usual fashion and a polymeric acrylic paper sheet having catalyst firmly attached and equally distribtued throughout the sheet is obtained. Upon analysis, the retention of the catalyst on the finished dry sheet is in excess of 90%, based on the known quantities added.

One inch diameter disks are cut from the finished electrode sheet and assembled in a hydrogen-oxygen fuel cell comprising a 5 N sulfuric acid electrolyte as set forth in the accompanying drawing. Polarization data is obtained with a catalyst loading of about 0.3 mg. platinum per square centimeter of geometric electrode surface. After twelve hours of continuous use, the electrode is found to be in operable condition and does not undergo distintegration.

Example 2

In a manner substantially identical to the procedure outlined in Example 1, a mixture is prepared by depositing about 10% platinum on the substantially pure graphitic carbon and an acrylic pulp containing 85% acrylonitrile and 15% methyl methacrylate copolymer. Resultant aqueous suspension forms a pulp containing about 67% of the platinum catalyst on a dry basis and 33% of the pulp on a dry basis. A sheet of acrylic paper is formed from the pulp suspension and contains the catalyst firmly attached to and evenly distributed in the acrylic paper sheet.

Retention of the catalyst on the finished sheet is found to be 85%.

One inch diameter disks are cut from the finished electrode sheet. These are inserted into a fuel cell containing a membrane comprising filter paper saturated in 5 N sulfuric acid. At a current density of 40 milliamperes per square centimeter, the voltage recorded is 0.4 volt after thirty minutes of operation.

Example 3

This example illustrates the preparation of an electrode having a water-repellent compound incorporated permitting the electrode to operate for at least one week or more.

In a suitable reaction vessel, 50 parts of "cyanamide process" graphitic carbon of 99% purity characterized by the conductivity in air between 40 and 50 reciprocal ohms per centimeter measured at 2000 p.s.i. having submicroscopic, hexagonal and platy crystals in the range of from 5 to 50 microns, are added to 50 parts of polyacrylonitrile pulp comprising 90% polyacrylonitrile and 10% polymethyl methacrylate. To the mixture are added 12.5 parts by weight of polytetrafluoroethylene as a latex suspension under agitation. Noble metal catalyst consisting of 6 parts platinum is deposited from chloroplatinic acid on the acrylic pulp and graphitic carbon together with water-repellent composition by reduction with sodium borohydride. The pulp is introduced into a paper making machine and a sheet is prepared therefrom in conventional manner. This sheet is of uniform thickness of 15 mils. Catalyst retention on the finished dry sheet is better than 90% based on quantities used. Examination of the sheet further shows that the catalyst is uniformly distributed and the sheet does not disintegrate in an acid fuel cell. When operating at a current density of 100 milliamperes per square centimeter after 30 minutes, the voltage is 0.68 volt.

*Example 4*

To 20 parts of a 4% suspension of well beaten, fibrillated acrylic pulp in 60 parts water is added 0.8 part graphite of a purity of 99%. To the mixture of graphite and pulp 0.024 part of a 65/35 styrene-butadiene copolymer is added as a 40% latex in water to act as a water-proofing agent. After stirring for 15 minutes, 0.45 part of chloroplatinic acid is added to the water-proofed mixture and reduced to metallic platinum by dropwise addition of 7 parts of a 5% solution of sodium borohydride. The resulting black pulp is formed into a paper electrode sheet by standard technique and dried. The dry sheet contains 1 mg. of platinum per square centimeter. A portion of this sheet is tested as both electrodes in a one inch hydrogen-oxygen fuel cell with 5 N sulfuric acid electrolyte. It gives a potential of 0.43 volt at 100 milliamperes per square centimeter.

*Example 5*

Repeating the procedure of Example 4 in every respect, except that 0.05 part of polyethylene is used as water-proofing agent, added as a 40% latex suspension in water. The resulting sheet after platinum deposition formation and drying is tested as in the previous example and gives a potential of 0.26 volt at 100 milliamperes per square centimeter.

*Example 6*

To 20 parts of a 4% suspension of a mixture of 75 parts unbeaten acrylic fiber and 25 parts well beaten acrylic fiber in 80 parts of distilled water is added 0.8 part of a graphite of 99% purity. Resultant mixture of graphite and pulp is water-proofed by addition of 0.4 part of polytetrafluoroethylene added as a 60% latex in water suspension. To the water-proofed mixture is added 0.9 part of chloroplatinic acid and the platinum reduced by dropwise addition of 12 parts of a 5% solution of sodium borohydride. The resulting black pulp containing catalyst, carbon and water-proofing agent is made into a paper electrode sheet by standard technique and dried to give an electrode sheet with platinum loading of 2 mg. per square centimeter. The paper is tested as an electrode in a one inch diameter hydrogen-oxygen fuel cell with 5 N sulfuric acid and gives a potential of 0.58 volt at 100 milliamperes per square centimeter. In addition, this electrode is employed in a fuel cell continuously operating at 40 milliamperes per square centimeter over a period of about 200 hours after which time the cell is taken apart and the electrode found to be in good condition for use.

*Example 7*

Substituting finely divided titanium metal powder of less than 200 mesh for the graphite in the above example and repeating the procedure in every detail, substantially the same cell performance is achieved.

In the following examples, unitary cell structures are exemplified.

*Example 8*

Two wet paper electrode sheets are formed following the procedure of Example 3, except that between them is placed a third sheet containing 50% acrylic fiber and 50% glass fiber formed into a wet sheet. The composite is pressed and dried as a unitary 3-ply sheet containing in both electrode layers 2 milligrams platinum per square centimeter of surface area. The dry composite sheet is then shaped into discs and assembled in a fuel cell shown in FIG. 2, above. This composite sheet is next equilibrated with 5 N sulfuric acid. Thereafter, the composite is tested in a one inch diameter hydrogen-oxygen fuel cell as described in Example 1. This cell gives a voltage of 0.59 volt at a current of 100 milliamperes per square centimeter and 0.49 volt at 184 milliamperes per square centimeter, respectively.

*Example 9*

Two wet paper electrode sheets are prepared using a pulp mixture consisting of 75% asbestos and 25% polyvinyl alcohol fiber by the reduction procedure similar in every detail to the procedure utilized in Example 3 above. Between these two sheets is placed a third sheet containing 75% asbestos and 25% polyvinyl alcohol fiber formed into a wet sheet. Resultant composite is pressed, dried and tested as in Example 8 employing 5 N potassium hydroxide instead of 5 N sulfuric acid. When the cell is assembled as in FIG. 2, it gives 0.55 volt at 100 milliamperes per square centimeter and 0.34 volt at 190 milliamperes per square centimeter.

We claim:

1. A fuel cell comprising in combination: a porous, hydrophilic, noncatalytic, electrolyte-containing matrix and directly contacted therewith a metallized paper sheet electrode, said sheet electrode comprising in admixture: (a) an unfused, fibrillated, substantially hydrophobic paper pulp in an amount ranging from about 30% to about 60%, (b) an electro-conductive filler selected from the group consisting of carbon, titanium, tantalum and zirconium, said filler being present in an amount ranging from about 25% to 50%, (c) a water-repellent compound present in an amount equal to from about 1% to about 25%, and (d) an active metal catalyst being present in an amount ranging from about 1% to less than about 25%, all of said percentages being based on the weight of the overall resultant electrode.

2. The fuel cell according to claim 1 in which the active metal of said electrode is a noble metal selected from the class consisting of platinum, palladium and ruthenium.

3. The fuel cell according to claim 1 in which the paper sheet is prepared from water-laid webs containing fibrillated wet-spun filaments containing at least 85% polyacrylonitrile.

4. The fuel cell according to claim 1 in which the paper sheet comprises 90% polyacrylonitrile and 10% polymethylmethacrylate.

5. The fuel cell according to claim 1 in which the paper sheet of said electrode is prepared from a mixture of fibrillated wet-spun filaments and unfibrillated filaments.

6. The fuel cell according to claim 1 in which the water-repellent compound is polytetrafluoroethylene.

7. The fuel cell according to claim 1 wherein the electro-conductive filler is carbon containing less than 1% impurities.

8. The fuel cell according to claim 1 in which the active metal catalyst is platinum.

9. An improved fuel cell comprising as the electrode and matrix therein a composite laminated structure, said structure comprising a laminate of a hydrophilic, noncatalytic electrolyte-equilibrated fibrous layer positioned between two electrodes, each of said electrodes being in sheet form and comprising in admixture: (a) an unfused, fibrillated, substantially hydrophobic paper pulp in an amount ranging from about 30% to about 60%, (b) an electroconductive filler selected from the group consisting of carbon, titanium, tantalum and zirconium, said filler being present in an amount ranging from about 25% to 50%, (c) a water-repellent compound present in an amount equal to from about 1% to about 25%, and (d)

an active metal catalyst being present in an amount ranging from about 1% to less than about 25%, all of said percentages being based on the weight of each of the overall resultant sheet electrodes.

10. A fuel cell according to claim 1, wherein the active metal catalyst is platinum.

No references cited.

WINSTON A. DOUGLAS, *Primary Examiner.*

H. FEELEY, *Assistant Examiner.*